(12) United States Patent
Liao et al.

(10) Patent No.: US 9,129,647 B2
(45) Date of Patent: Sep. 8, 2015

(54) SERVO CHANNEL WITH EQUALIZER ADAPTATION

(71) Applicant: LSI Corporation, San Jose, CA (US)

(72) Inventors: Yu Liao, Longmont, CO (US); Xun Zhang, Westford, MA (US); Haitao Xia, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/136,051

(22) Filed: Dec. 20, 2013

(65) Prior Publication Data

US 2015/0179213 A1   Jun. 25, 2015

Related U.S. Application Data

(60) Provisional application No. 61/918,503, filed on Dec. 19, 2013.

(51) Int. Cl.
| | |
|---|---|
| *G11B 5/02* | (2006.01) |
| *G11B 20/10* | (2006.01) |
| *G11B 5/55* | (2006.01) |
| *G11B 5/035* | (2006.01) |

(52) U.S. Cl.
CPC .......... *G11B 20/10046* (2013.01); *G11B 5/035* (2013.01); *G11B 5/5526* (2013.01)

(58) Field of Classification Search
CPC ........... G11B 5/5526; G11B 20/10046; G11B 2005/0013; G11B 5/035
USPC .......................... 360/55, 65, 77.08, 75, 77.01
See application file for complete search history.

(56) References Cited

U.S. PATENT DOCUMENTS

| | | | |
|---|---|---|---|
| 5,450,253 A * | 9/1995 | Seki et al. ...................... 360/65 |
| 6,535,553 B1 | 3/2003 | Limberg et al. |
| 7,194,674 B2 * | 3/2007 | Okumura et al. ............. 714/795 |
| 7,248,630 B2 | 7/2007 | Modrie |
| 7,257,764 B2 | 8/2007 | Suzuki |
| 7,421,017 B2 | 9/2008 | Takatsu |
| 7,502,189 B2 | 3/2009 | Sawaguchi |
| 7,715,471 B2 | 5/2010 | Werner |
| 7,929,238 B1 | 4/2011 | Vasquez |
| 8,018,360 B2 | 9/2011 | Nayak |
| 8,046,666 B2 | 10/2011 | Park et al. |
| 8,208,213 B2 | 6/2012 | Liu |

(Continued)

OTHER PUBLICATIONS

U.S. Appl. No. 13/777,915, filed Feb. 26, 2013, Jun Xiao, Unpublished.

(Continued)

*Primary Examiner* — Thomas Alunkal
(74) *Attorney, Agent, or Firm* — Hamilton DeSanctis & Cha (57) ABSTRACT

A servo system includes an equalizer circuit operable to filter digital servo data samples according to filter tap coefficients to yield equalized data, a detector circuit operable to apply a data detection algorithm to the equalized data to yield hard decisions, a convolution circuit operable to yield ideal digital data based on the hard decisions and on target values, a subtraction circuit operable to subtract the ideal digital data from the equalized data to yield an adaptation error signal, an error gradient calculator operable calculate an error gradient signal based at least in part on the adaptation error signal, and a tap adaptation circuit operable to calculate values of the filter tap coefficients based on the error gradient signal.

20 Claims, 4 Drawing Sheets

(56) References Cited

U.S. PATENT DOCUMENTS

| | | |
|---|---|---|
| 8,604,960 B2 | 12/2013 | Liao |
| 8,767,333 B2 | 7/2014 | Xia |
| 8,913,475 B2* | 12/2014 | Shiraishi .................. 369/124.01 |
| 8,976,913 B2* | 3/2015 | Buehner et al. ............... 375/350 |
| 2004/0114912 A1* | 6/2004 | Okamoto et al. ............. 386/114 |
| 2005/0094304 A1* | 5/2005 | Ohkubo et al. ................. 360/65 |
| 2006/0123285 A1 | 6/2006 | De Araujo |
| 2008/0180825 A1* | 7/2008 | Erden et al. ..................... 360/39 |
| 2008/0253438 A1* | 10/2008 | Riani et al. .................... 375/232 |
| 2009/0002862 A1 | 1/2009 | Park et al. |
| 2010/0067621 A1 | 3/2010 | Noelder |
| 2010/0177419 A1* | 7/2010 | Liu et al. ........................ 360/32 |
| 2010/0211830 A1* | 8/2010 | Sankaranarayanan et al. . 714/55 |
| 2011/0072335 A1 | 3/2011 | Liu et al. |
| 2011/0075569 A1 | 3/2011 | Marrow |
| 2011/0157737 A1 | 6/2011 | Grundvig et al. |
| 2011/0164332 A1 | 7/2011 | Cao |
| 2011/0167227 A1 | 7/2011 | Yang et al. |
| 2012/0019946 A1 | 1/2012 | Aravind |
| 2012/0056612 A1 | 3/2012 | Mathew |
| 2012/0069891 A1 | 3/2012 | Zhang |
| 2012/0106607 A1 | 5/2012 | Miladinovic et al. |
| 2012/0124119 A1 | 5/2012 | Yang |
| 2012/0124241 A1 | 5/2012 | Yang et al. |
| 2012/0236430 A1 | 9/2012 | Tan |
| 2013/0054664 A1 | 2/2013 | Chang |
| 2013/0097213 A1* | 4/2013 | Liao et al. ..................... 708/306 |

OTHER PUBLICATIONS

U.S. Appl. No. 13/346,556, filed Jan. 9, 2012, Haitao Xia, Unpublished.

U.S. Appl. No. 13/525,182, filed Jun. 15, 2012, Yang Han, Unpublished.

U.S. Appl. No. 13/525,188, filed Jun. 15, 2012, Yang Han, Unpublished.

U.S. Appl. No. 13/551,507, filed Jul. 17, 2012, Ming Jin, Unpublished.

U.S. Appl. No. 13/490,913, filed Jun. 7, 2012, Xun Zhang, Unpublished.

U.S. Appl. No. 13/491,135, filed Jun. 7, 2012, Xun Zhang, Unpublished.

U.S. Appl. No. 13/742,336, filed Jan. 15, 2013, Jianzhong Huang, Unpublished.

U.S. Appl. No. 13/491,062, filed Jun. 7, 2012, Jin Lu, Unpublished.

U.S. Appl. No. 13/597,046, filed Aug. 28, 2012, Lu Pan, Unpublished.

U.S. Appl. No. 14/106,537, filed Dec. 13, 2013, Rui Cao, Unpublished.

U.S. Appl. No. 13/773,886, filed Feb. 22, 2013, Dahua Qin, Unpublished.

U.S. Appl. No. 13/777,937, filed Feb. 26, 2013, Rui Cao, Unpublished.

U.S. Appl. No. 13/912,159, filed Jun. 6, 2013, Jin Lu, Unpublished.

U.S. Appl. No. 13/912,171, filed Jun. 6, 2013, Lu Lu, Unpublished.

U.S. Appl. No. 13/886,049, filed May 2, 2013, Xun Zhang, Unpublished.

U.S. Appl. No. 14/055,886, filed Oct. 17, 2013, Xiufeng Song, Unpublished.

U.S. Appl. No. 14/029,559, filed Sep. 17, 2013, Rui Cao, Unpublished.

U.S. Appl. No. 13/562,140, filed Jul. 30, 2012, Haotian Zhang, Unpublished.

* cited by examiner

SERVO CHANNEL WITH EQUALIZER ADAPTATION

CROSS REFERENCE TO RELATED APPLICATIONS

The present application claims priority to (is a non-provisional of) U.S. Pat. App. No. 61/918,503, entitled "Servo Channel With Equalizer Adaptation", and filed Dec. 19, 2013 by Liao et al, the entirety of which is incorporated herein by reference for all purposes.

FIELD OF THE INVENTION

Various embodiments of the present invention provide systems and methods for adapting filter coefficients for an equalizer in a servo channel.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. The location of data on the storage medium is identified by servo data. It is important to properly filter the signal read from the storage medium to enable the values of the servo data to be detected.

SUMMARY

Various embodiments of the present invention provide systems, apparatuses and methods for adapting filter coefficients for an equalizer in a servo channel, and in some embodiments, for adapting a target in a servo channel.

In some embodiments, a servo system includes an equalizer circuit operable to filter digital servo data samples according to filter tap coefficients to yield equalized data, a detector circuit operable to apply a data detection algorithm to the equalized data to yield hard decisions, a convolution circuit operable to yield ideal digital data based on the hard decisions and on target values, a subtraction circuit operable to subtract the ideal digital data from the equalized data to yield an adaptation error signal, an error gradient calculator operable calculate an error gradient signal based at least in part on the adaptation error signal, and a tap adaptation circuit operable to calculate values of the filter tap coefficients based on the error gradient signal.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention.

Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

A servo channel with equalizer adaptation is disclosed herein which compensates for changing channel conditions and supports relatively long equalizers for high channel density. In some embodiments, at least some of the servo data is bi-phase encoded, and the detection algorithm applied to the servo data is a low latency but relatively low accuracy peak detection algorithm. The equalizer can be, but is not limited to, a digital finite impulse response filter, which filters the read back signal to the desired shape that facilitates detection of data values. The equalizer adaptation disclosed herein thus facilitates detection of servo data values even in a peak detector by adapting the equalizer filter coefficients to the channel conditions. In some embodiments, a joint equalizer/target equalization is performed in the servo channel, adapting the partial response target for the servo channel as the equalizer is adapted. The adaptation is performed on the fly during normal operation in some embodiments. In some other embodiments, the adaptation is performed during a calibration process, after which the equalizer filter coefficients and target values are fixed. In some embodiments, constraints are placed on the equalizer adaptation, constraining either the main equalizer tap coefficient or the side tap next to the main tap to programmable fixed values as the other coefficients are adapted. In some embodiments, adaptation of the equalizer and of the target can be independently disabled.

Figure 1:
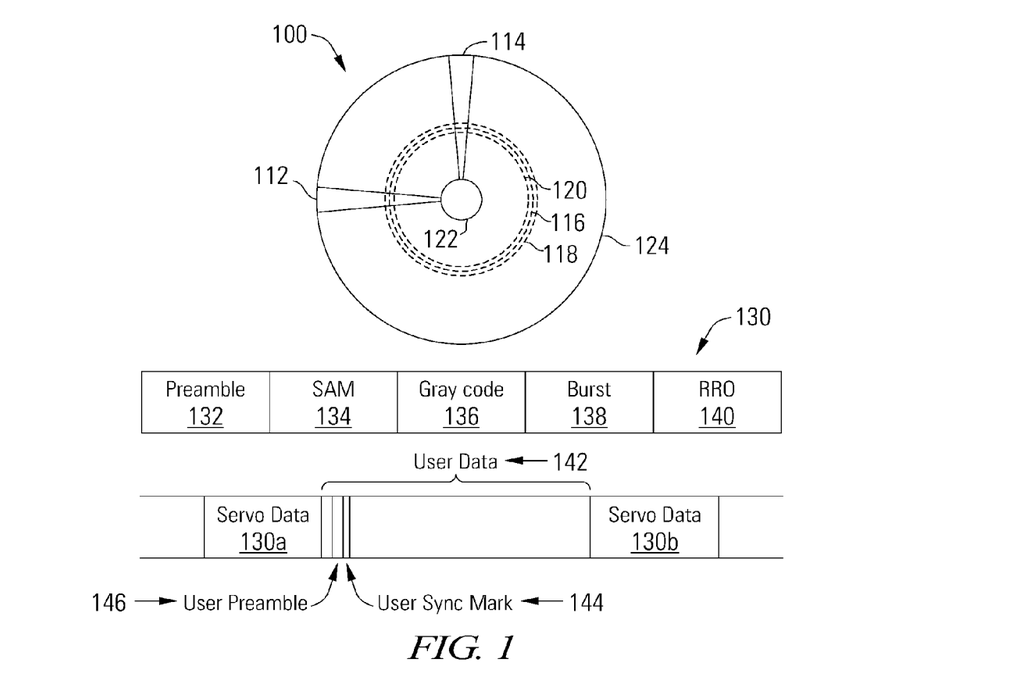
FIG. 1 is a diagram of a magnetic storage medium and sector data scheme that may be used with a servo channel with equalizer adaptation in accordance with some embodiments of the present invention.

Turning to FIG. 1, a magnetic storage medium 100 is shown with an example data track 116 and its two adjacent neighboring data tracks 118, 120 on disk platter 124, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark (SAM) 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information, some of which can be used as a mark to establish a point of reference from which processing of the data within user data region 142 may begin.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

The data processing system that processes some or all of the servo data (e.g., 130) retrieved from servo regions (e.g., 112) is referred to herein as a servo channel. During calibration or normal operation or both, equalizer tap coefficients are adapted based on channel conditions, and in some embodiments, a servo channel partial response target is also adapted based on channel conditions.

Figure 2:
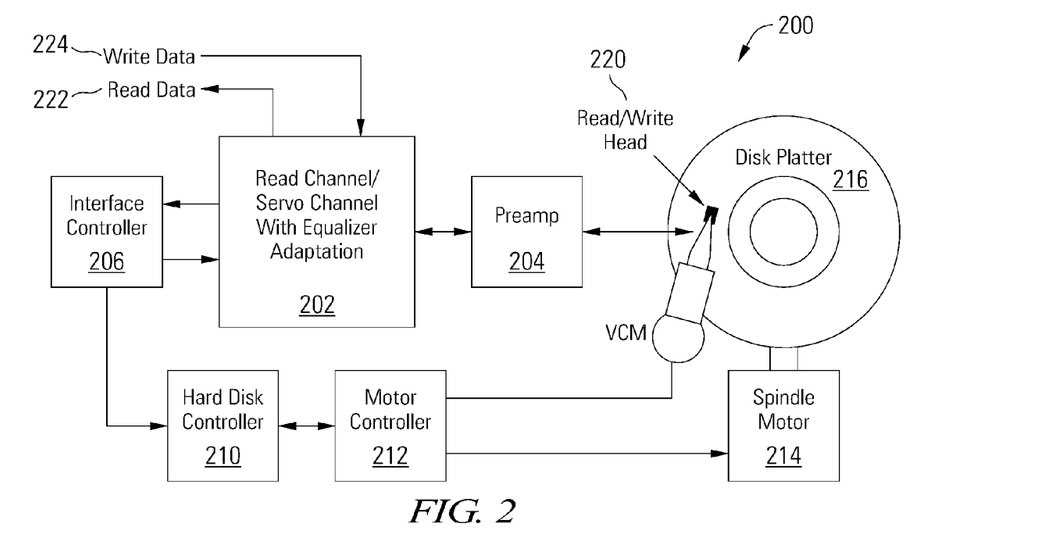
FIG. 2 depicts a storage system including a read channel/servo channel with equalizer adaptation in accordance with some embodiments of the present invention.

Turning to FIG. 2, a storage system 200 is disclosed which includes a read channel/servo channel circuit 202 with equalizer adaptation in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. While reading servo data, or during a calibration process, read channel/servo channel circuit 202 adapts equalizer tap coefficients and, in some embodiments, servo channel targets. Such equalizer adaptation can be implemented consistent with that disclosed below in relation to FIGS. 3-4. In some cases, the equalizer adaptation can be performed consistent with the flow diagram disclosed below in relation to FIG. 5.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
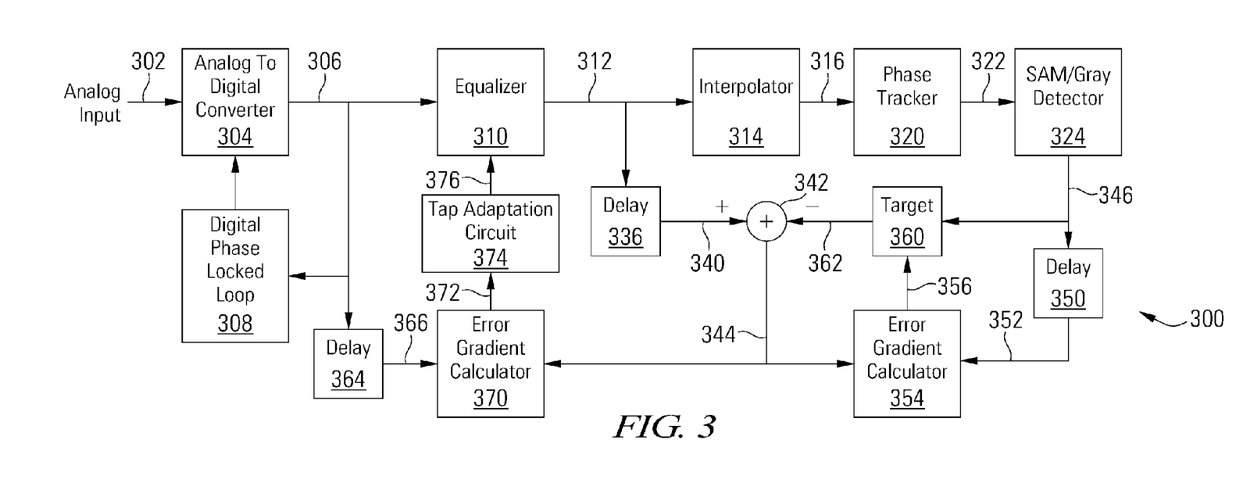
FIG. 3 is a block diagram of a servo channel with equalizer adaptation and target adaptation in accordance with some embodiments of the present invention.

Turning to FIG. 3, a servo channel 300 with equalizer adaptation and target adaptation is depicted in accordance with some embodiments of the present invention. Servo channel 300 includes an analog to digital converter circuit 304 that receives an analog signal 302 representing servo data (e.g., 130). In some cases, analog signal 302 is derived from a read/write head assembly (e.g., 220) that is disposed in relation to a storage medium (e.g., 216). Based upon the disclosure provided herein, one of ordinary skill in the art will recognize a variety of sources from which analog input 302 can be derived. In some embodiments, the data written to at least some servo fields on the storage medium is bi-phase encoded. In these embodiments, a servo data bit is represented by non-return to zero (NRZ) data written to the storage medium that has two phases separated by a transition. In some cases, for example, a servo data bit with value "0" in the servo address mark 134 or Gray code 136 is represented by NRZ bits "1100".

Analog to digital converter circuit 304 converts analog signal 302 into a corresponding series of digital samples 306. Analog to digital converter circuit 304 can be any circuit known in the art that is capable of producing digital samples 306 corresponding to an analog input signal 302. Based upon the disclosure provided herein, one of ordinary skill in the art will recognize a variety of analog to digital converter circuits that can be used in relation to different embodiments of the present invention. The analog to digital converter circuit 304 samples analog signal 302 according to a clock signal from a digital phase locked loop 308 which locks the sampling phase based on the digital samples 306.

Digital samples 306 are provided to an equalizer circuit 310. Equalizer circuit 310 applies an equalization algorithm to digital samples 306, shaping them to yield an equalized output 312. In some embodiments of the present invention, equalizer circuit 310 is a digital finite impulse response filter circuit as are known in the art. The equalizer circuit 310 is configured by a number of filter tap coefficients 376 which adjust the filtering applied to the digital samples 306. By adapting the filter tap coefficients 376 based on conditions in the servo channel 300, the ability of servo channel 300 to correctly recover the original values is improved. Equalizer circuit 310 can be any circuit known in the art that is capable of filtering digital samples according to adaptable filter tap coefficients 376. Based upon the disclosure provided herein, one of ordinary skill in the art will recognize a variety of equalizer circuits that can be used in relation to different embodiments of the present invention.

Equalized output 312 is provided to an interpolation circuit 314 which is operable to interpolate between the digital samples 306 to yield interpolated samples 316. In some embodiments, interpolation circuit 314 is a bank of digital phase interpolators. Interpolation circuit 314 can be any circuit known in the art that is capable of interpolating between digital samples to effectively change the sampling phase in the interpolated samples 316. Based upon the disclosure provided herein, one of ordinary skill in the art will recognize a variety of interpolators that can be used in relation to different embodiments of the present invention.

The interpolated samples 316 are provided to a phase tracking circuit 320 which is operable to perform open loop phase tracking of interpolated samples 316. The phase tracking circuit 320 is operable to stabilize the phase of interpolated samples 316, removing any phase variations that may occur, yielding detector input 322. Phase tracking circuit 320 can be any circuit known in the art that is capable of detecting phase changes using open loop control and stabilizing the phase of the output samples. Based upon the disclosure provided herein, one of ordinary skill in the art will recognize a variety of phase tracking circuits that can be used in relation to different embodiments of the present invention.

The detector input 322 is provided to a detector 324, operable in some embodiments to detect values of servo address mark bits and Gray code bits in detector input 322. In some embodiments, detector 324 is a peak detector as is known in the art. In some of these embodiments, the data bits in detector input 322 have actual values of either 1 or −1, and the peak detector 322 applies a threshold of 0 volts in a comparison of each bit of the detector input 322. If the incoming bit of detector input 322 is greater than 0, the corresponding hard decision at hard decision output 346 is 1, and if the incoming bit of detector input 322 is less than 0, the corresponding hard decision at hard decision output 346 is −1. Based upon the disclosure provided herein, one of ordinary skill in the art will recognize a variety of data detector circuits that can be used in relation to different embodiments of the present invention. The servo address mark bits and Gray code bits in hard decision output 346 can be used for any suitable purpose, such as, but not limited to, determining whether the read/write head assembly (e.g., 220) is positioned correctly over the disk platter (e.g., 216).

The servo channel 300 adapts both the equalizer circuit 310 and a servo channel partial response target 360. In various embodiments, the adaptation can be performed continuously or periodically during normal operation, or in a calibration process before normal operation, etc. Adaptation of the equalizer circuit 310 and the target 360 can be independently disabled in some embodiments, enabling the servo channel 300 to adapt both the equalizer circuit 310 and the target 360, one or the other, or neither. For example, adaptation of one or the other can be disabled to reduce power usage or to prevent oscillations once values have substantially converged in the adaptation process.

The hard decision output 346 is provided to a target circuit 360, which is operable to convolve the hard decision output 346 with a target response or partial response target to yield ideal samples 362. Based upon the disclosure provided herein, one of ordinary skill in the art will recognize a variety of convolution circuits that can be used in relation to different embodiments of the present invention.

A delay circuit 336 delays the equalized output 312 so that the resulting delayed equalized output 340 is aligned with the ideal samples 362, based on the delay imposed between equalized output 312 and ideal samples 362 by interpolation circuit 314, phase tracking circuit 320, detector 324, target circuit 360, and any other intervening circuits, if any. The ideal samples 362 are subtracted from delayed equalized output 340 in subtraction circuit 342, yielding adaptation error 344.

A delay circuit 350 delays the hard decision output 346 so that the resulting delayed hard decision output 352 is aligned with the adaptation error 344, based on the delay imposed between hard decision output 346 and adaptation error 344 by target circuit 360, subtraction circuit 342 and any other intervening circuits, if any. The delayed hard decision output 352 and adaptation error 344 are provided to an error gradient calculator 354, which yields an error gradient 356. In some embodiments, the error gradient calculator 354 multiplies the delayed hard decision output 352 by the adaptation error 344. The target circuit 360 is also operable to generate new target values with which the hard decision output 346 are convolved, based upon the error gradient 356, in order to reduce the error gradient 356. The target circuit 360 can generate new target values using any suitable algorithm, such as, but not limited to, a least mean squares algorithm or a zero forcing adaptation algorithm.

A delay circuit 364 delays the digital samples 306 so that the resulting delayed digital samples 366 are aligned with the adaptation error 344, based on the delay imposed between digital samples 306 and adaptation error 344 by equalizer circuit 310, interpolation circuit 314, phase tracking circuit 320, detector 324, target circuit 360, subtraction circuit 342 and any other intervening circuits, if any. The delayed digital samples 366 and adaptation error 344 are provided to an error gradient calculator 370, which yields an error gradient 372. In some embodiments, the error gradient calculator 370 multiplies the delayed digital samples 366 by the adaptation error 344.

The error gradient calculator 370 is provided to a tap adaptation circuit 374, which is operable to calculate filter tap coefficients 376 for the equalizer circuit 310 based on the error gradient calculator 370. The tap adaptation circuit 374 generates new filter tap coefficients 376 using any suitable algorithm, such as, but not limited to, a least mean squares algorithm or a zero forcing adaptation algorithm. Based upon the disclosure provided herein, one of ordinary skill in the art will recognize a variety of adaptation circuits that can be used in relation to different embodiments of the present invention to reduce an error signal.

In some embodiments, because the detector 324 is peak driven and the sampling phase of the analog to digital converter circuit 304 is locked to be at around the peak-zero phase, the equalizer circuit 310 should have zero phase shift. A symmetric constraint is therefore applied in some embodiments to the adaptation of the filter tap coefficients 376 performed by the tap adaptation circuit 374. In some cases, a main tap constraint is applied both for the tap adaptation circuit 374 and the target circuit 360, where the center filter tap coefficient is constrained to a fixed value. In some other cases, one or more side taps next to the center tap are constrained with a side tap constraint. In some embodiments, the fixed values are programmable. In some embodiments, a scaling factor applied during adaptation is programmable.

Figure 4:
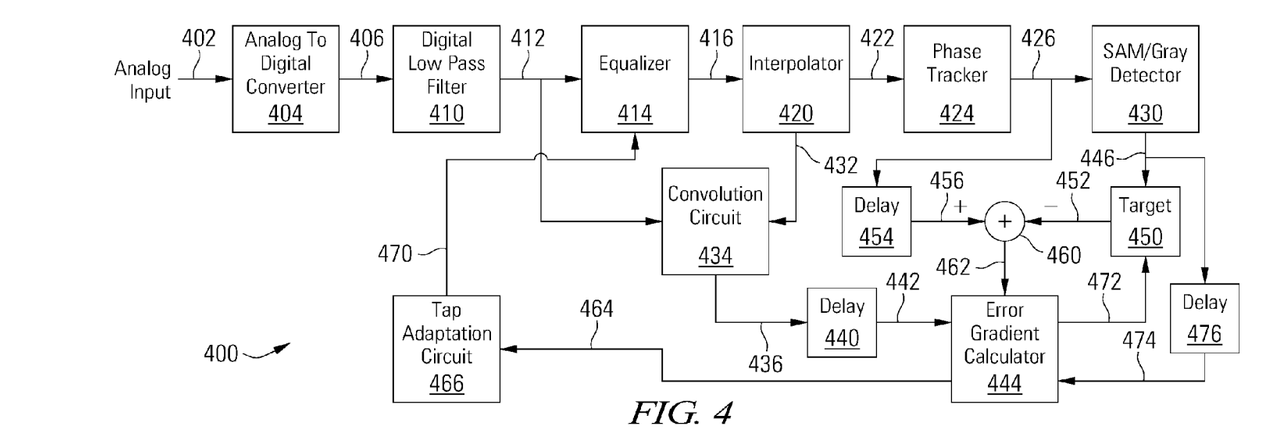
FIG. 4 is a block diagram of a servo channel with equalizer adaptation in accordance with some embodiments of the present invention.

Turning to FIG. 4, a servo channel 400 with equalizer adaptation is depicted in accordance with some embodiments of the present invention. Servo channel 300 includes an analog to digital converter circuit 404 that receives an analog signal 402 representing servo data (e.g., 130). In some cases, analog signal 402 is derived from a read/write head assembly (e.g., 220) that is disposed in relation to a storage medium (e.g., 216). Based upon the disclosure provided herein, one of ordinary skill in the art will recognize a variety of sources from which analog input 402 can be derived.

Analog to digital converter circuit 404 converts analog signal 402 into a corresponding series of digital samples 406. Analog to digital converter circuit 404 can be any circuit known in the art that is capable of producing digital samples 406 corresponding to an analog input signal 402. Based upon the disclosure provided herein, one of ordinary skill in the art will recognize a variety of analog to digital converter circuits that can be used in relation to different embodiments of the present invention. In this embodiment, the analog to digital converter circuit 404 oversamples the analog signal 402. A digital low pass filter (DLPF) 410 is therefore provided to filter digital samples 406, yielding filtered digital samples 412. Also in this embodiment, the sampling phase of the analog to digital converter circuit 404 is not locked by a phase locked loop. However, phase excursions are corrected in phase tracking circuit 424.

Filtered digital samples 412 are provided to an equalizer circuit 414. Equalizer circuit 414 applies an equalization algorithm to filtered digital samples 412, shaping them to yield an equalized output 416. In some embodiments of the present invention, equalizer circuit 414 is a digital finite impulse response filter circuit as are known in the art. The equalizer circuit 414 is configured by a number of filter tap coefficients 470 which adjust the equalization filtering applied to the filtered digital samples 412. By adapting the filter tap coefficients 470 based on conditions in the servo channel 400, the ability of servo channel 400 to correctly recover the original values is improved. Equalizer circuit 414 can be any circuit known in the art that is capable of filtering digital samples according to adaptable filter tap coefficients 470. Based upon the disclosure provided herein, one of ordinary skill in the art will recognize a variety of equalizer circuits that can be used in relation to different embodiments of the present invention.

Equalized output 416 is provided to an interpolation circuit 420 which is operable to interpolate between the samples in equalized output 416 to yield interpolated samples 422. In some embodiments, interpolation circuit 420 is a bank of digital phase interpolators. Interpolation circuit 420 can be any circuit known in the art that is capable of interpolating between digital samples to effectively change the sampling phase in the interpolated samples 422. Based upon the disclosure provided herein, one of ordinary skill in the art will recognize a variety of interpolators that can be used in relation to different embodiments of the present invention.

The interpolated samples 422 are provided to a phase tracking circuit 424 which is operable to perform open loop phase tracking of interpolated samples 422. The phase tracking circuit 424 is operable to stabilize the phase of interpolated samples 422, removing any phase variations that may occur, yielding detector input 426. Phase tracking circuit 424 can be any circuit known in the art that is capable of detecting phase changes using open loop control and stabilizing the phase of the output samples. Based upon the disclosure provided herein, one of ordinary skill in the art will recognize a variety of phase tracking circuits that can be used in relation to different embodiments of the present invention.

The detector input 426 is provided to a detector 430, operable in some embodiments to detect values of servo address mark bits and Gray code bits in detector input 426. In some embodiments, detector 430 is a peak detector as is known in the art. Based upon the disclosure provided herein, one of ordinary skill in the art will recognize a variety of data detector circuits that can be used in relation to different embodiments of the present invention. In the absence of errors, the hard decision output 446 from detector 430 contains the NRZ bits written to the storage medium. The servo address mark bits and Gray code bits in hard decision output 446 can be used for any suitable purpose, such as, but not limited to, determining whether the read/write head assembly (e.g., 220) is positioned correctly over the disk platter (e.g., 216).

The servo channel 400 adapts the filter tap coefficients 470 for the equalizer circuit 414. In various embodiments, the adaptation can be performed continuously or periodically during normal operation, or in a calibration process before normal operation, etc. Adaptation of the equalizer circuit 414 can be disabled in some embodiments, for example, to reduce power usage or to prevent oscillations once values have substantially converged in the adaptation process.

The hard decision output 446 is provided to a target circuit 450, which is operable to convolve the hard decision output 446 with a target response or partial response target for the servo channel 400 to yield ideal samples 452. Based upon the disclosure provided herein, one of ordinary skill in the art will recognize a variety of convolution circuits that can be used in relation to different embodiments of the present invention.

A delay circuit 454 delays the detector input 426 so that the resulting delayed detector input 456 is aligned with the ideal samples 452, based on the delay imposed between detector input 426 and ideal samples 452 by detector 430, target circuit 450, and any other intervening circuits, if any. The ideal samples 452 are subtracted from delayed detector input 456 in subtraction circuit 460, yielding adaptation error 462.

A convolution circuit 434 convolves the filtered digital samples 412 with interpolated samples 432 from interpolation circuit 420, yielding convolution result 436. A delay circuit 440 delays the convolution result 436 so that the resulting delayed sample stream 442 is aligned with the adaptation error 462, based on the delay imposed by equalizer circuit 414, interpolator circuit 420, phase tracker 426, SAM/Gray detector 430, and the ideal target sample generation circuit 450 and any other intervening circuits, if any. The resulting delayed sample stream 442 and the adaptation error 462 are provided to an error gradient calculator 444, which yields an error gradient 464. In some embodiments, the error gradient calculator 444 multiplies the delayed sample stream 442 by the adaptation error 462 to generate error gradient 464.

The error gradient 464 is provided to a tap adaptation circuit 466, which is operable to calculate filter tap coefficients 470 for the equalizer circuit 414 based on the error gradient 464. The tap adaptation circuit 466 generates new filter tap coefficients 470 using any suitable algorithm, such as, but not limited to, a least mean squares algorithm or a zero forcing adaptation algorithm. Based upon the disclosure provided herein, one of ordinary skill in the art will recognize a variety of adaptation circuits that can be used in relation to different embodiments of the present invention to reduce an error signal.

In some embodiments, the servo channel 400 also enables target circuit 450 adapt the target values with which the hard decision output 446 is convolved. A delay circuit 476 delays the hard decision output 446 so that the resulting delayed hard decision output 474 is aligned with the adaptation error 462. The error gradient calculator 444 calculates error gradient 472 based on the delayed hard decision output 474 and the adaptation error 462. In some embodiments, the error gradient calculator 444 multiplies the adaptation error 462 and the delayed hard decision output 474 to generate error gradient 472. The target circuit 450 is operable to generate new target values with which the hard decision output 446 is convolved, based upon the error gradient 472, in order to reduce the error gradient 472. The target circuit 450 can generate new target values using any suitable algorithm, such as, but not limited to, a least mean squares algorithm or a zero forcing adaptation algorithm.

In some embodiments, because the detector 430 is peak driven, the equalizer circuit 414 should have zero phase shift. A symmetric constraint is therefore applied in some embodiments to the adaptation of the filter tap coefficients 470 performed by the tap adaptation circuit 466. In some cases, a main tap constraint is applied both for the tap adaptation circuit 466, where the center filter tap coefficient is constrained to a fixed value. In some other cases, one or more side taps next to the center tap are constrained with a side tap constraint. In some embodiments, the fixed values are programmable. In some embodiments, a scaling factor applied during adaptation is programmable.

Figure 5:
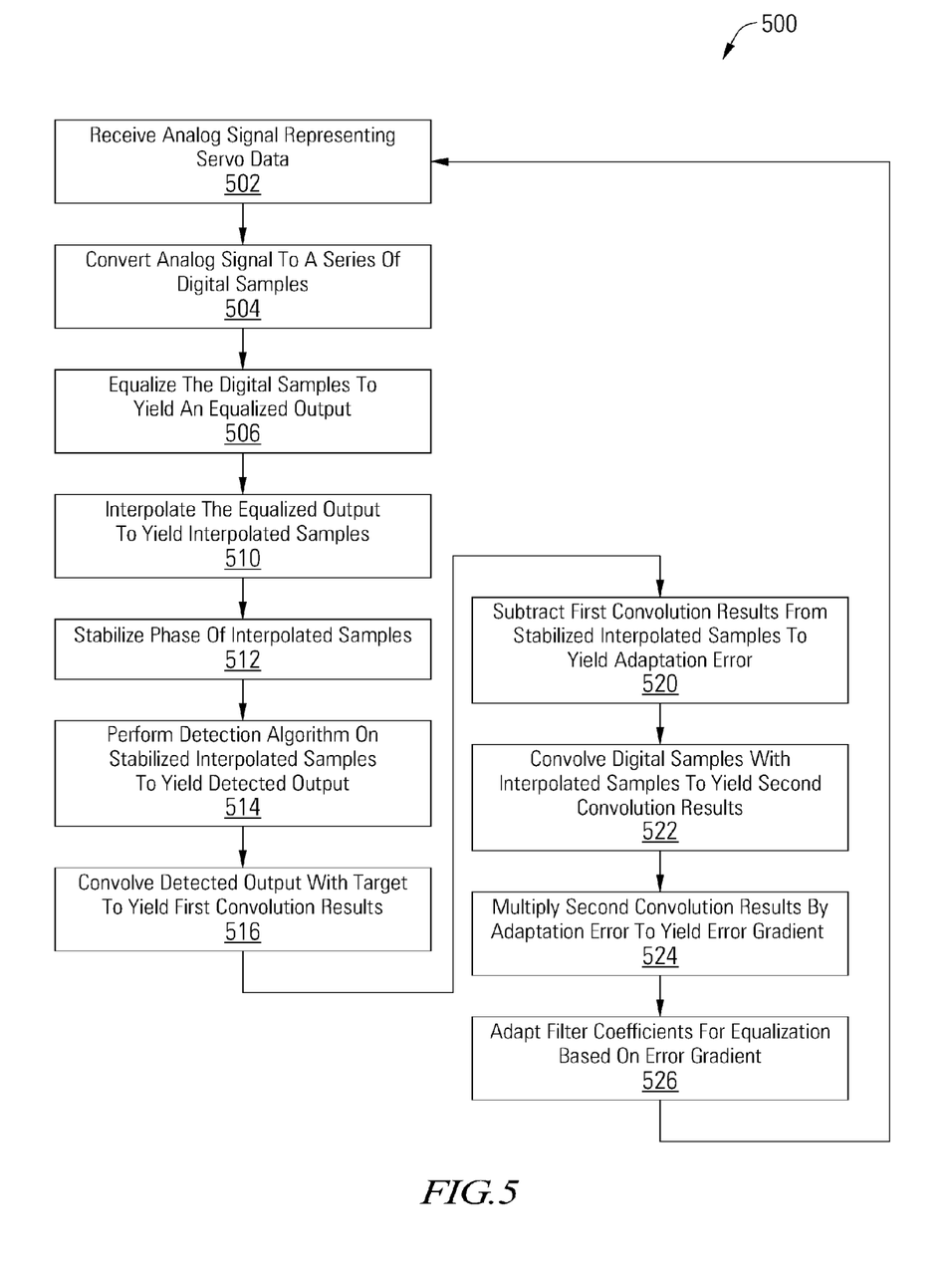
FIG. 5 is a flow diagram showing a method for adapting equalizer filter coefficients in a servo channel in accordance with some embodiments of the present invention.

Turning to FIG. 5, a flow diagram 500 shows a method for adapting equalizer filter coefficients in a servo channel in accordance with some embodiments of the present invention. Following flow diagram 500, an analog signal representing servo data is received. (Block 502) The analog signal is converted to a series of digital samples and, in some embodiments, the sampling phase does not need to be controlled. Thus, the digital samples do not have a stable phase. If the analog signal is oversampled, a digital low pass filter is used for anti-aliasing before decimation and equalization. (Block 504) The digital samples are equalized to yield an equalized output. (Block 506) The equalized output is interpolated to yield interpolated samples. (Block 510) The phase of the interpolated samples is stabilized in a phase tracking circuit. (Block 512) In some embodiments, the interpolation is performed using a bank of interpolation filters. A detection algorithm is performed on the stabilized interpolated samples to yield a detected output. (Block 514) In some embodiments, the detection algorithm comprises a peak detection algorithm. The detected output is convolved with a target to yield first convolution results. (Block 516) The first convolution results are subtracted from the stabilized interpolated samples to yield an adaptation error. (Block 520) The digital samples from Block 504 are convolved with the interpolator in Block 510 to yield second convolution results. (Block 522) The second convolution results are multiplied by the adaptation error to yield an error gradient. (Block 524) The filter coefficients for equalization are adapted based on the error gradient. (Block 526) The adaptation process can implement any suitable adaptation algorithm, such as, but not limited to, a least means squares reduction algorithm or zero forcing adaptation algorithm. In some embodiments, the target is also adapted based on the adaptation error and the detected output. In some embodiments, the equalization adaptation and target adaptation process is only enabled during SAM and/or Gray processing, and can be done in parallel or enabled/disabled independently.

Figure 6:
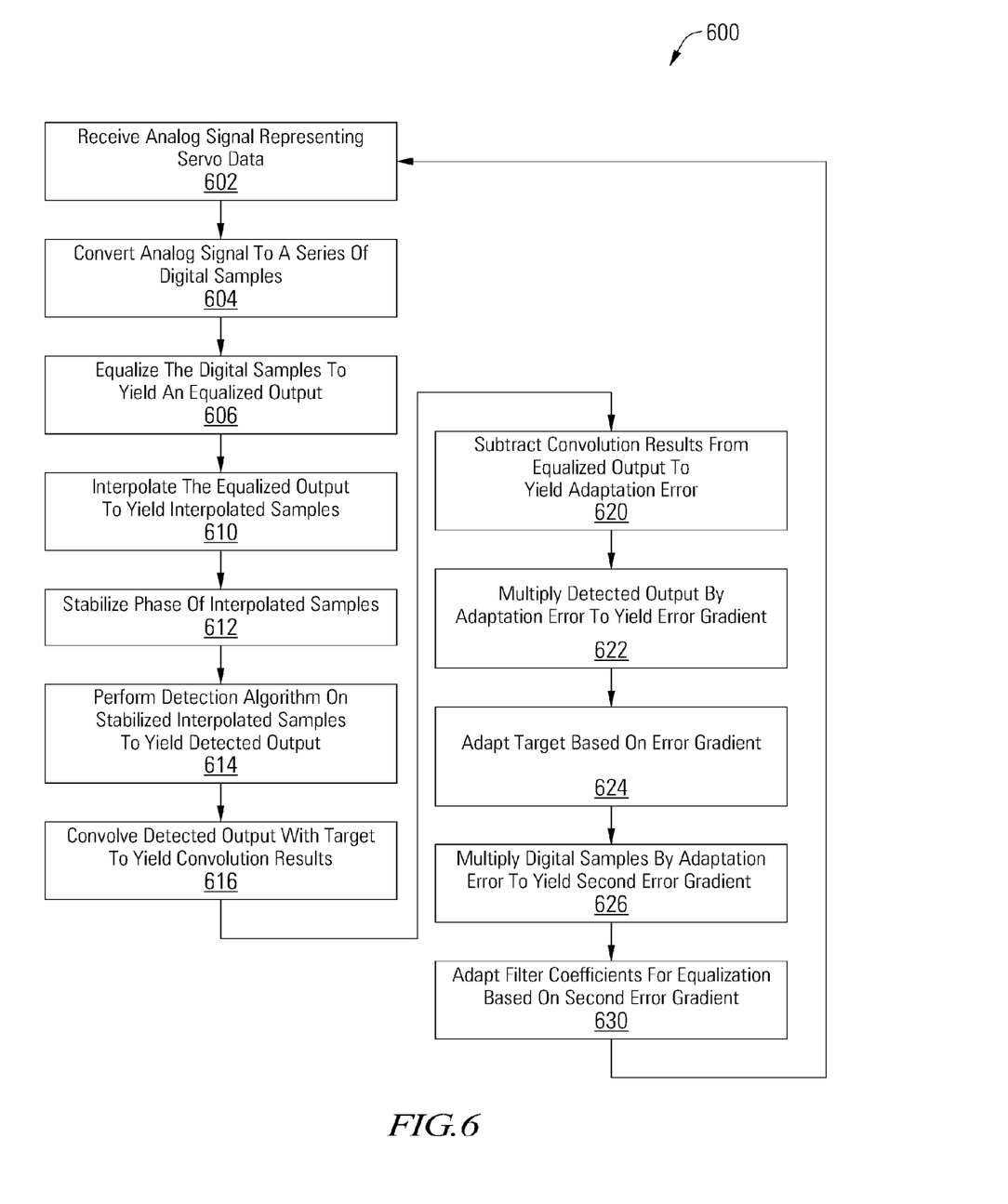
FIG. 6 is a flow diagram showing a method for equalizer and target adaptation in a servo channel in accordance with some embodiments of the present invention.

Turning to FIG. 6, a flow diagram 600 shows a method for equalizer and target adaptation in a servo channel in accordance with some embodiments of the present invention. Following flow diagram 600, an analog signal representing servo data is received. (Block 602) The analog signal is converted to a series of digital samples and the sampling phase is controlled by a digital phase locked loop, yielding digital samples with a stable phase. (Block 604) The digital samples are equalized to yield an equalized output. (Block 606) The equalized output is interpolated to yield interpolated samples. (Block 610) The phase of the interpolated samples is tracked and fine tuned in a phase tracking circuit. (Block 612) In some embodiments, the interpolation is performed using a bank of interpolation filters. A detection algorithm is performed on the stabilized interpolated samples to yield a detected output. (Block 614) In some embodiments, the detection algorithm comprises a peak detection algorithm. The detected output is convolved with a target to yield convolution results. (Block 616) The convolution results are subtracted from the equalized output to yield an adaptation error. (Block 620) The detected output is multiplied by the adaptation error to yield an error gradient. (Block 622) The target is adapted based on the error gradient. (Block 624) The digital samples are multiplied by the adaptation error to yield a second error gradient. (Block 626) The filter coefficients for equalization are adapted based on the second error gradient. (Block 630) The adaptation process can implement any suitable adaptation algorithm, such as, but not limited to, a least means squares reduction algorithm or zero forcing adaptation algorithm. In some embodiments, the equalization adaptation and target adaptation process is only enabled during SAM and/or Gray processing, and can be done in parallel or enabled/disabled independently.

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel equalizer and target adaptation in a servo channel. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A servo system comprising:
   a hardware equalizer circuit operable to filter digital servo data samples according to filter tap coefficients to yield equalized data;
   a hardware detector circuit operable to apply a data detection algorithm to the equalized data to yield hard decisions;
   a convolution circuit operable to convolve the hard decisions with a target response to yield ideal digital data;
   a subtraction circuit operable to subtract the ideal digital data from the equalized data to yield an adaptation error signal;
   an error gradient calculator operable calculate an error gradient signal based at least in part on the adaptation error signal, wherein the error gradient calculator is operable to calculate the error gradient signal by multiplying the digital servo data samples with the adaptation error signal;
   a tap adaptation circuit operable to calculate values of the filter tap coefficients based on the error gradient signal; and
   a second error gradient calculator operable to calculate a second error gradient signal based on the hard decisions and on the adaptation error signal, wherein the convolution circuit is further operable to adapt the target response based on the second error gradient signal.

2. The servo system of claim 1, further comprising an interpolation circuit operable to perform phase interpolation on the equalized data before the data detection algorithm is applied.

3. The servo system of claim 2, further comprising a phase tracking circuit operable to stabilize a sampling phase of the equalized data before the data detection algorithm is applied.

4. The servo system of claim 2, further comprising a second convolution circuit operable to convolve the equalized data with an output of the interpolation circuit to yield convolution results.

5. The servo system of claim 4, wherein the error gradient calculator is operable to calculate the error gradient signal by multiplying the adaptation error signal with the convolution results.

6. The servo system of claim 1, wherein the detector circuit comprises a peak detector.

7. The servo system of claim 1, wherein the tap adaptation circuit is operable to apply constraints to the filter tap coefficients.

8. The servo system of claim 7, wherein the constraints maintain a value of at least one of the filter tap coefficients as others of the filter tap coefficients are adapted, wherein the constraints are selected from a group consisting of main tap constraints and side tap constraints, and wherein the constraints force the filter tap coefficients to be symmetric around a main tap.

9. The servo system of claim 1, wherein the tap adaptation circuit is operable to be selectively disabled.

10. The servo system of claim 1, further comprising an analog to digital converter operable to oversample an analog signal to generate the digital servo data samples, and a digital low pass filter operable to filter the digital servo data samples.

11. The servo system of claim 1, further comprising an analog to digital converter operable to sample an analog signal to generate the digital servo data samples, and a digital phase locked loop operable to control a sampling phase of the analog to digital converter.

12. A method for equalizer adaptation in a servo channel, comprising:
   equalizing digital data samples in a hardware equalizer based on filter tap coefficients to yield an equalized output;
   performing a detection algorithm on the equalized output to yield a detected output;
   convolving the detected output with a target response to yield ideal digital data samples;
   subtracting the ideal digital data samples from the equalized output to yield an adaptation error signal;
   calculating an error gradient signal based at least in part on the adaptation error signal;
   adapting the filter tap coefficients based on the error gradient signal; and
   calculating a second error gradient signal by multiplying the detected output with the adaptation error signal, and adapting the target response based on the second error gradient signal.

13. The method of claim 12, further comprising applying constraints to the filter tap coefficients during the adapting.

14. The method of claim 12, wherein the error gradient signal is calculated by multiplying the adaptation error signal by the digital data samples.

15. The method of claim 12, further comprising interpolating between the equalized output before performing the detection algorithm.

16. The method of claim 12, further comprising stabilizing a phase of the equalized output before performing the detection algorithm.

17. A storage device, comprising:
   a storage medium operable to store user data and servo data;
   a head assembly disposed in relation to the storage medium and operable to read and write data on the storage medium; and
   a servo system operable to process a signal read from the storage medium by the head assembly corresponding to the servo data, the servo system comprising:
   an analog to digital converter operable to sample the signal to yield digital data;
   an equalizer operable to filter the digital data based on filter tap coefficients to yield equalized data samples;
   a detector operable to detect values of the equalized data samples to yield hard decisions;
   a convolution circuit operable to convolve the hard decisions with a target response to yield ideal digital data;
   a subtraction circuit operable to subtract the ideal digital data from the equalized data samples to yield an adaptation error signal;

an error gradient calculator operable to calculate an error gradient signal based at least in part on the adaptation error signal for adaptation of the equalizer;

a tap adaptation circuit operable to calculate values of the filter tap coefficients for the equalizer based on the error gradient signal;

a second error gradient calculator operable to calculate a second error gradient signal based at least in part on the adaptation error signal for target filter adaptation; and a second tap adaptation circuit operable to calculate values of the filter tap coefficients for the target based on the second error gradient signal.

18. The storage device of claim 17, further comprising an interpolation circuit operable to perform phase interpolation on the equalized data samples before the detector.

19. The storage device of claim 18, further comprising a phase tracking circuit operable to stabilize a sampling phase in the analog to digital converter.

20. The storage device of claim 17, wherein the detector comprises a peak detector.

* * * * *